(12) United States Patent
Chen

(10) Patent No.: US 11,604,329 B2
(45) Date of Patent: Mar. 14, 2023

(54) OPTICAL ELEMENT ADJUSTMENT DEVICE AND PROJECTOR

(71) Applicant: Coretronic Corporation, Hsin-Chu (TW)

(72) Inventor: Yii-Wen Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 264 days.

(21) Appl. No.: 17/151,218

(22) Filed: Jan. 18, 2021

(65) Prior Publication Data

US 2021/0223495 A1  Jul. 22, 2021

(30) Foreign Application Priority Data

Jan. 20, 2020 (CN) .......................... 202020128542.8

(51) Int. Cl.
*G02B 7/182* (2021.01)
*G03B 21/14* (2006.01)

(52) U.S. Cl.
CPC ......... *G02B 7/1822* (2013.01); *G02B 7/1821* (2013.01); *G03B 21/142* (2013.01)

(58) Field of Classification Search
CPC ... G02B 7/1822; G02B 7/1821; G03B 21/142
USPC ................................. 359/811, 819, 822, 829
See application file for complete search history.

(56) References Cited

U.S. PATENT DOCUMENTS

2004/0042096 A1\* 3/2004 Nomura ................. G02B 7/026
359/822

FOREIGN PATENT DOCUMENTS

| CN | 100589005 | 2/2010 |
| CN | 102135710 | 7/2011 |
| CN | 106816335 | 6/2017 |

\* cited by examiner

*Primary Examiner* — William Choi
(74) *Attorney, Agent, or Firm* — JCIPRNET

(57) ABSTRACT

An optical element adjustment device includes a casing base, an optical element, a bearing element, and a first adjustment module. The optical element is movably disposed in the casing base. The bearing element includes an outer frame bearing the optical element and a shaft portion protruding from the outer frame and penetrating from the casing base. The first adjustment module is disposed on the shaft portion. A screw shank is sleeved on the shaft portion and penetrates from the casing base. The first adjustment element is screwed to the screw shank and abuts against the casing base. A limiting element protrudes from a side surface of the shaft portion and is located next to the screw shank. The first elastic element is disposed between the screw shank and the outer frame, such that the screw shank leans closely to the limiting element.

20 Claims, 8 Drawing Sheets

OPTICAL ELEMENT ADJUSTMENT DEVICE AND PROJECTOR

CROSS-REFERENCE TO RELATED APPLICATION

This application claims the priority benefit of China application serial no. 202020128542.8, filed on Jan. 20, 2020. The entirety of the above-mentioned patent application is hereby incorporated by reference herein and made a part of this specification.

BACKGROUND

Technical Field

The disclosure relates to an adjustment device and a projector, and more particularly to an optical element adjustment device and a projector having the optical element adjustment device.

Description of Related Art

In a projector, since the tolerance of mechanism assembly may cause the angle of a beam reflected by a lens to be different from the original design value, such that the position of a laser speckle is not at the optimal position, thereby causing overly high energy, such that the fluorescent layer of a fluorescent color wheel is burnt. Therefore, how to adjust the position of an optical element such as the lens is the current research direction.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY

The disclosure provides an optical element adjustment device, which can adjust the position of the optical element.

The disclosure provides a projector, which has the optical element adjustment device.

Other objectives and advantages of the disclosure can be further understood from the technical features disclosed by the disclosure.

In order to achieve one, some, or all of the above objectives or other objectives, an optical element adjustment device of the disclosure includes a casing base, an optical element, a bearing element, and a first adjustment module, wherein the optical element is movably disposed in the casing base. The bearing element includes an outer frame bearing the optical element and a shaft portion protruding from the outer frame and penetrating from the casing base. The first adjustment module is disposed on the shaft portion. The first adjustment module includes a screw shank, a first adjustment element, a limiting element, and a first elastic element. The screw shank is sleeved on the shaft portion and penetrates from the casing base. The first adjustment element is screwed to the screw shank and abuts against the casing base. The limiting element protrudes from a side surface of the shaft portion and is located next to the screw shank. The first elastic element is disposed between the screw shank and the outer frame of the bearing element, such that the screw shank leans closely to the limiting element, thereby linking the shaft portion to the screw shank in an extension direction of the shaft portion, wherein the first adjustment element is configured to drive the screw shank to move along the extension direction and the shaft portion of the bearing element moves correspondingly, such that the optical element fixed to the bearing element moves along the extension direction.

A projector of the disclosure includes a light source module, a light valve, and a projection lens. The light source module includes a light source and the optical element adjustment device, the light source is configured to emit an excitation beam, the optical element adjustment device is located on an optical path of the excitation beam, wherein the optical element adjustment device includes a casing base, an optical element, a bearing element, and a first adjustment module. The optical element is movably disposed in the casing base. The bearing element includes an outer frame bearing the optical element and a shaft portion protruding from the outer frame and penetrating from the casing base. The first adjustment module is disposed on the shaft portion. The first adjustment module includes a screw shank, a first adjustment element, a limiting element, and a first elastic element. The screw shank is sleeved on the shaft portion and penetrates from the casing base. The first adjustment element is screwed to the screw shank and abuts against the casing base. The limiting element protrudes from a side surface of the shaft portion and is located next to the screw shank. The first elastic element is disposed between the screw shank and the outer frame of the bearing element, such that the screw shank leans closely to the limiting element, thereby linking the shaft portion to the screw shank in an extension direction of the shaft portion, wherein the first adjustment element is configured to drive the screw shank to move along the extension direction and the shaft portion of the bearing element moves correspondingly, such that the optical element fixed to the bearing element moves along the extension direction. The light valve is configured to convert the excitation beam into an image beam. The projection lens is configured to project the image beam.

Based on the above, the optical element adjustment device of the disclosure allows the screw shank to lean closely to the limiting element protruding from the shaft portion through sleeving the screw shank of the first adjustment module on the shaft portion of the bearing element and disposing the first elastic element between the screw shank and the bearing element, such that the shaft portion is linked to the screw shank in the extension direction. In addition, since the optical element adjustment device is screwed to the screw shank through the first adjustment element of the first adjustment module, the screw shank is driven by rotating the first adjustment element to move along the extension direction and the shaft portion of the bearing element moves correspondingly, such that the optical element fixed to the bearing element moves along the extension direction, thereby adjusting the position of the optical element along the extension direction.

To make the aforementioned more comprehensible, several embodiments accompanied with drawings are described in detail as follows.

Other objectives, features and advantages of the disclosure will be further understood from the further technological features disclosed by the alternative of the disclosure suffix there are shown and described preferred exemplary of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate example of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
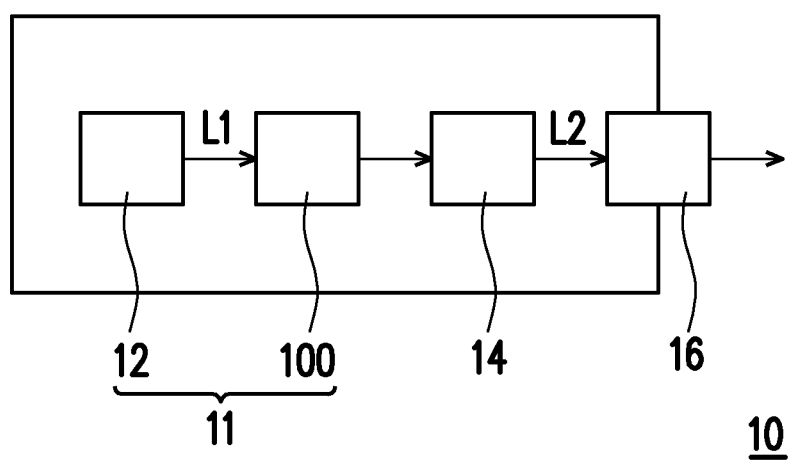
FIG. 1 is a schematic view of a projector according to the disclosure.

FIG. 1 is a schematic view of a projector according to an embodiment of the disclosure. Please refer to FIG. 1. In the embodiment, a projector 10 includes a light source module 11, a light valve 14, and a projection lens 16. The light source module 11 includes a light source 12 and an optical element adjustment device 100. The light source 12 is configured to emit an excitation beam L1. The optical element adjustment device 100 is located on an optical path of the excitation beam L1. In some embodiments, the light source 12 may include a light emitting diode, a laser diode, or other light sources. The light emitted by the light source 12 is, for example, blue light or red light, but may also be beams of other colors, and the disclosure is not limited thereto. For example, the light source 12 may include a plurality of laser elements (not shown), the laser elements are, for example, arranged in an array, and the laser elements are, for example, laser diodes (LDs). In other embodiments, the light source 12 may be multiple. In other embodiments, the light source 12 may be, for example, a solid-state illumination source of the light emitting diode.

The light valve 14 is located on a transmission path of an excitation beam L1 and is configured to convert the excitation beam L1 into an image beam L2. In the embodiment, the light valve 14 is, for example, a reflective light modulator such as a digital micro-mirror device (DMD) or a liquid crystal on silicon panel (LCoS panel). In some embodiments, the light valve 14 may be, for example, a transmissive light modulator such as a liquid crystal display panel, an electro-optic modulator, a magneto-optic modulator, or an acousto-optic modulator (AOM). However, the disclosure does not limit the form and type of the light valve 14.

In the embodiment, the projection lens 16 is disposed on a transmission path of the image beam L2 and is configured to project the image beam L2 out of the projector 10. The projection lens 16 includes, for example, a combination of one or more non-planar optical lenses having refractive power, such as various combinations including non-planar lenses such as a biconcave lens, a biconvex lens, a concave-convex lens, a convex-concave lens, a plano-convex lens, and a plano-concave lens. In an embodiment, the projection lens 16 may also include a planar optical lens, for projecting the image beam L2 out of the projector 10 in a reflective or transmissive manner. The disclosure does not limit the form and type of the projection lens 16.

In an unillustrated embodiment, the quantity of the light source 12 may be two sets. The two sets of light sources 12 are disposed perpendicular to each other along two sides of a rectangle and the optical element adjustment device 100 is obliquely disposed between the two sets of light sources 12 (such as disposed along the diagonal of the rectangle) to combine the two excitation beams L1 emitted from the two sets of light sources 12. Each set of the light sources 12 may have several rows of laser diodes in the height direction, wherein the rows of the laser diodes of one set of the light sources 12 are staggered from the rows of the laser diodes of the other set of the light sources 12 in the height direction. The optical element on the optical element adjustment device 100 is, for example, a mirror, a beam splitting mirror, a dichroic mirror, etc. The structure of the optical element may correspondingly have transmissive regions (such as at odd regions, corresponding to one set of the light sources 12) and reflective regions (such as at even regions, corresponding to the other set of the light sources 12) in a staggered arrangement to combine the excitation beams L1 from different directions. This type of light combination is very sensitive to the alignment in the height direction. If the optical element of the optical element adjustment device 100 can move up and down in the height direction, it can help improve light efficiency. The optical element adjustment device 100, which enables the optical element to move up and down along the height direction, will be described below.

Figure 2:
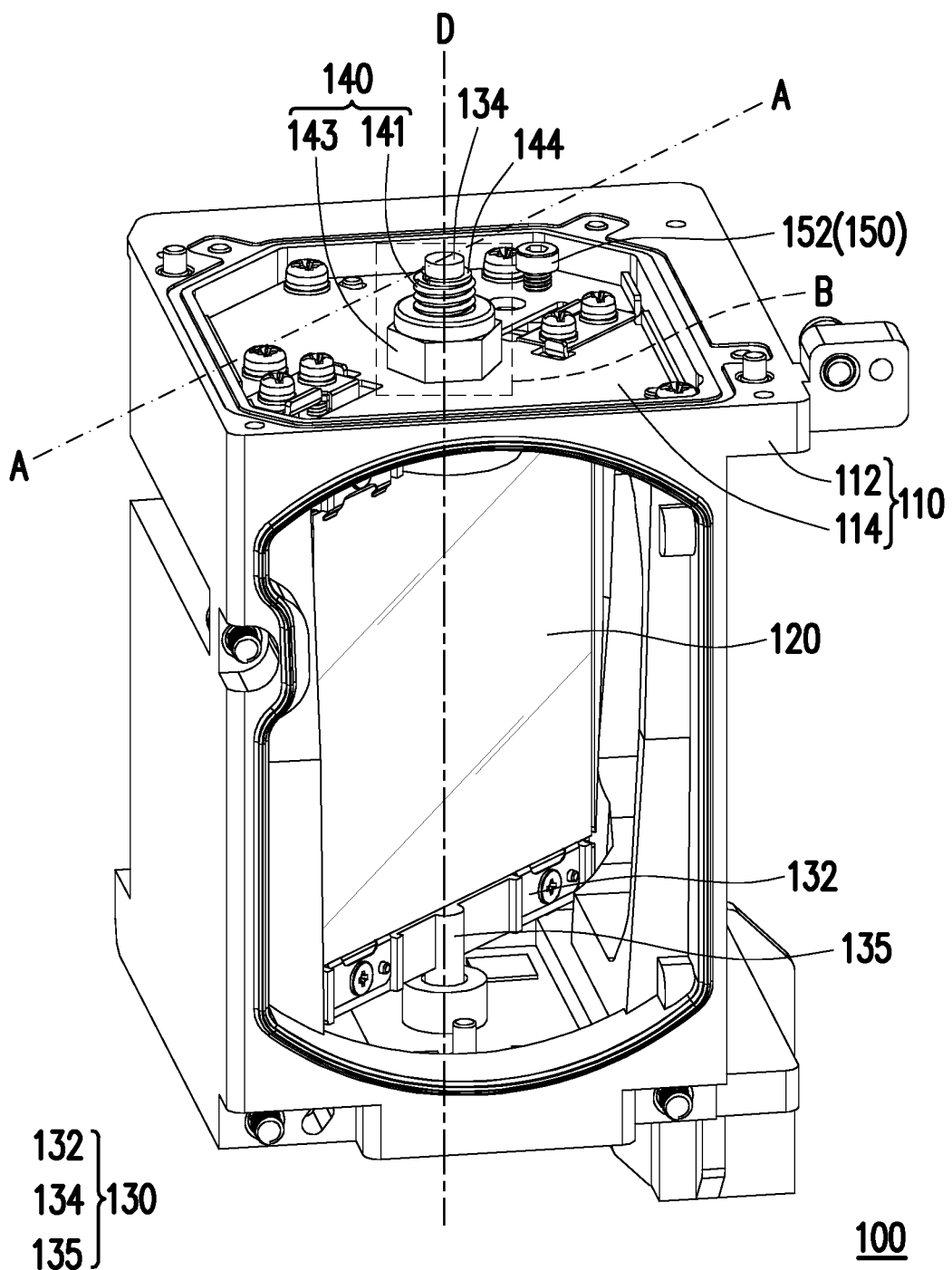
FIG. 2 is a schematic view of an optical element adjustment device of the projector of FIG. 1.
Figure 3:
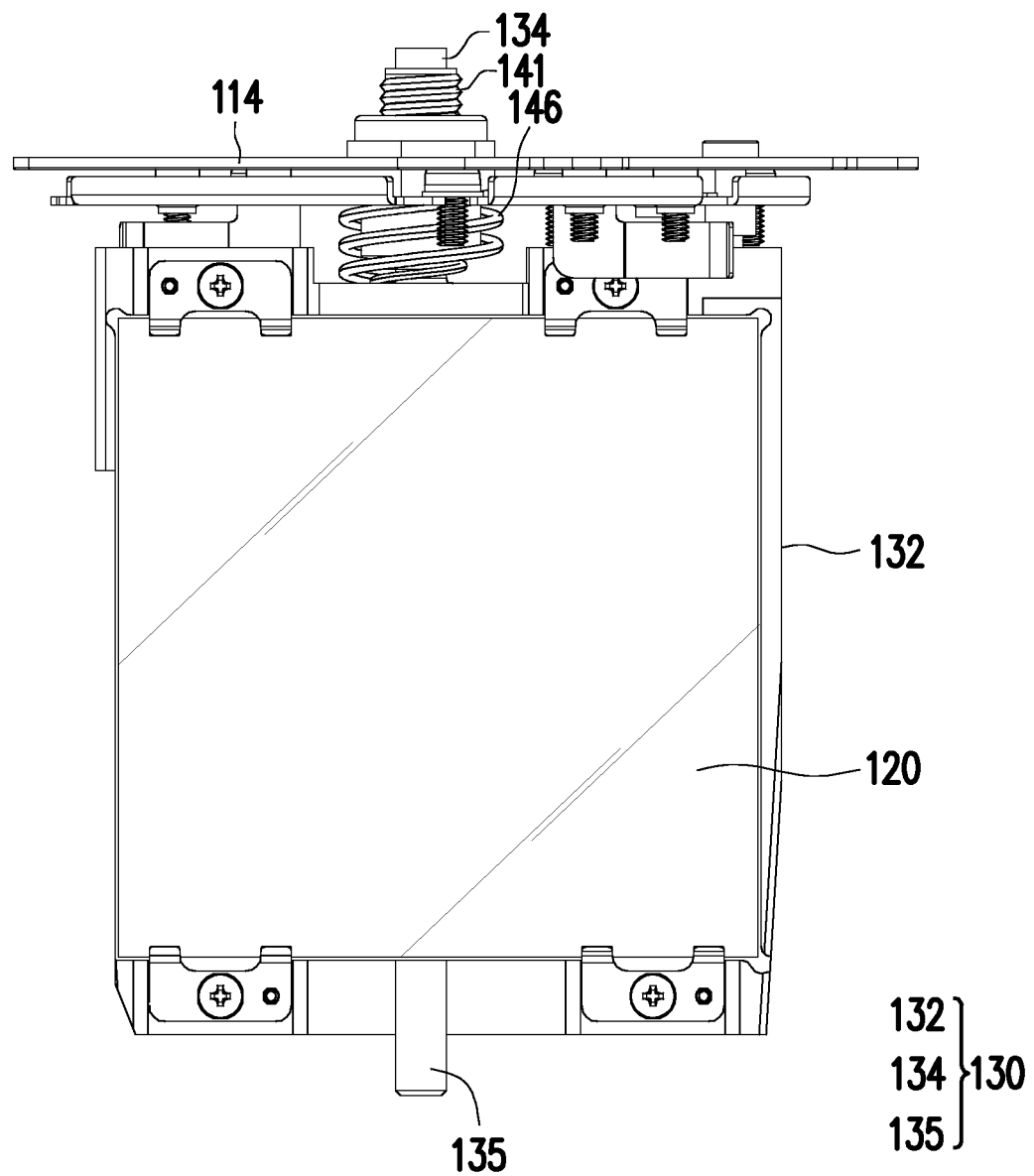
FIG. 3 is a schematic view hiding a casing base of the optical element adjustment device of FIG. 2.
Figure 4:
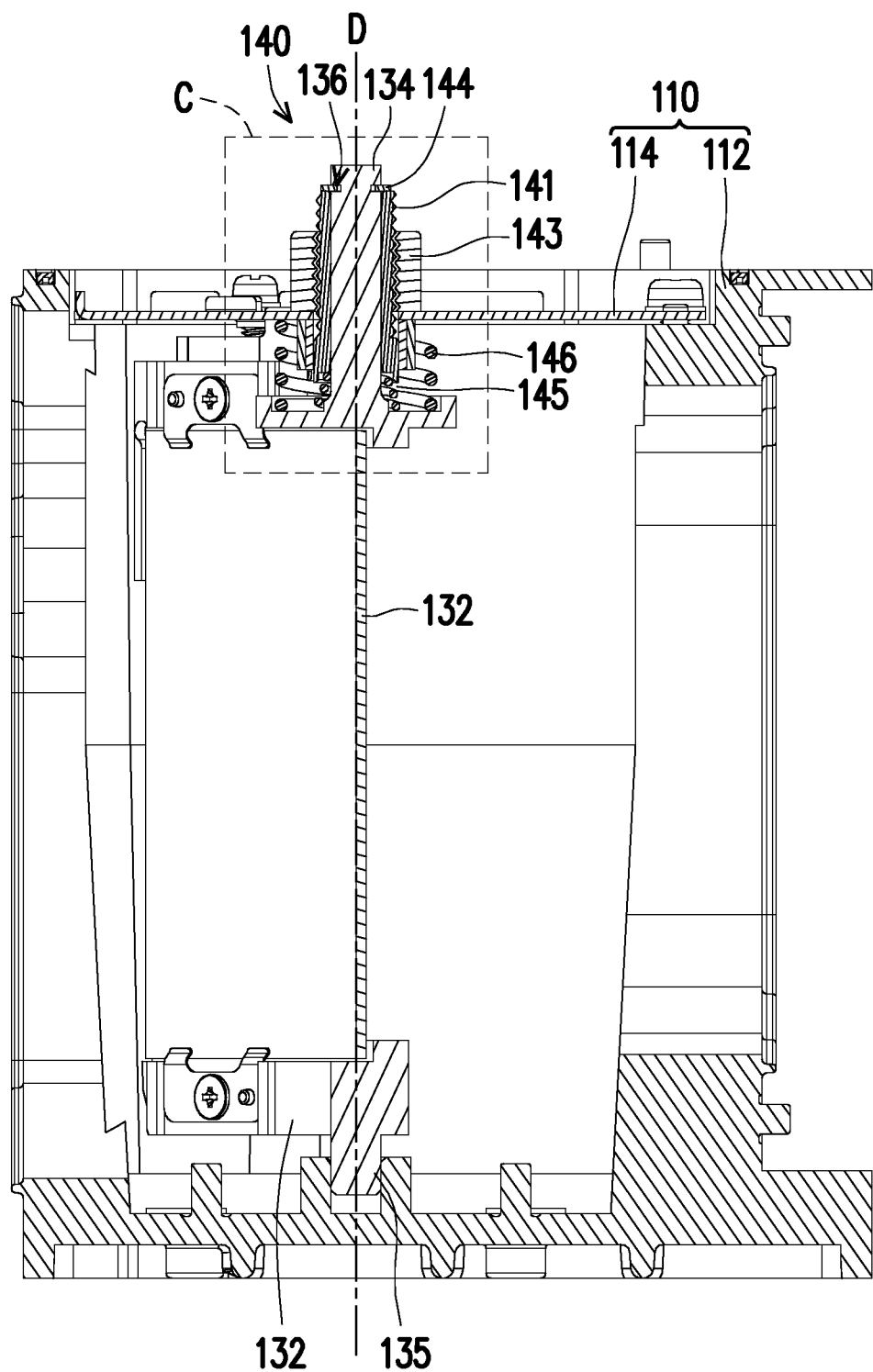
FIG. 4 is a cross-sectional view of the optical element adjustment device of FIG. 2 taken along the A-A line segment.
Figure 5:
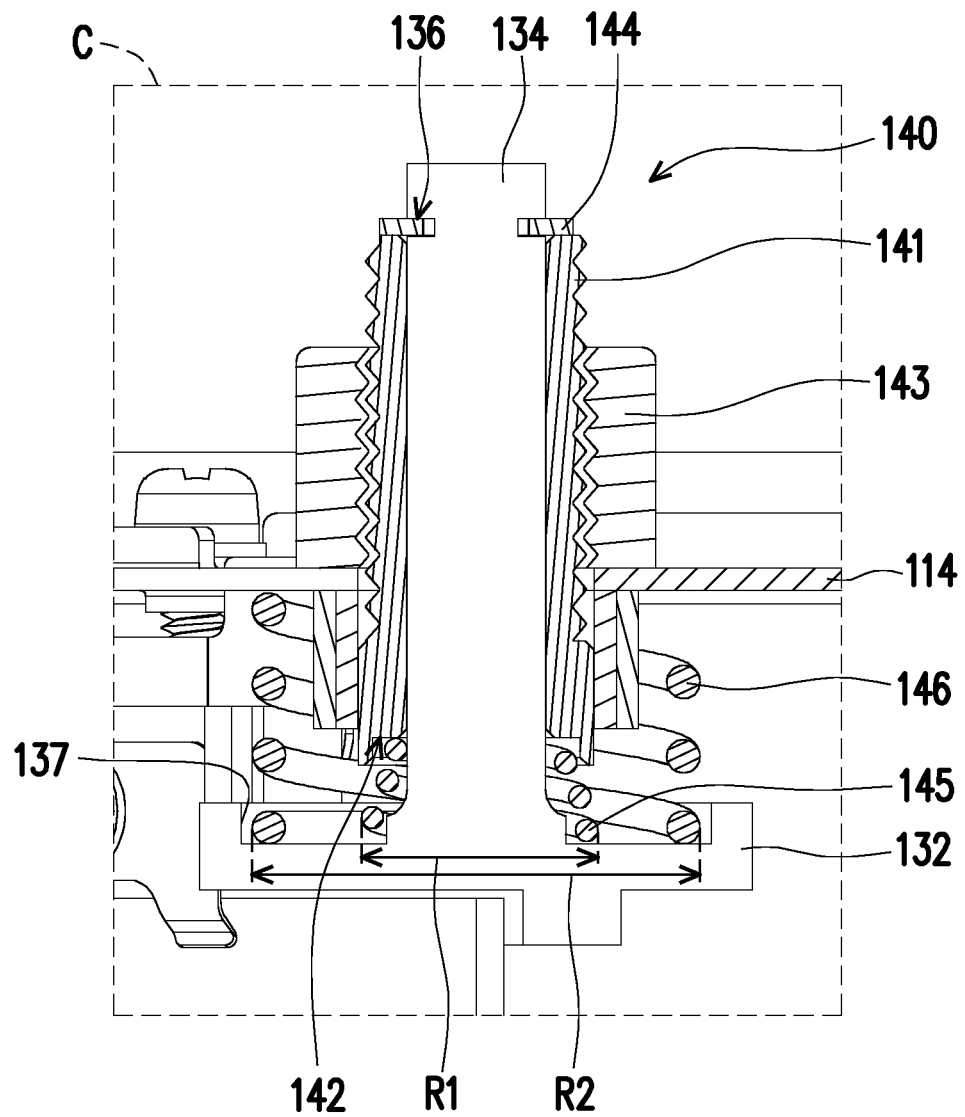
FIG. 5 is an enlarged view of a region C of FIG. 4.
Figure 6:
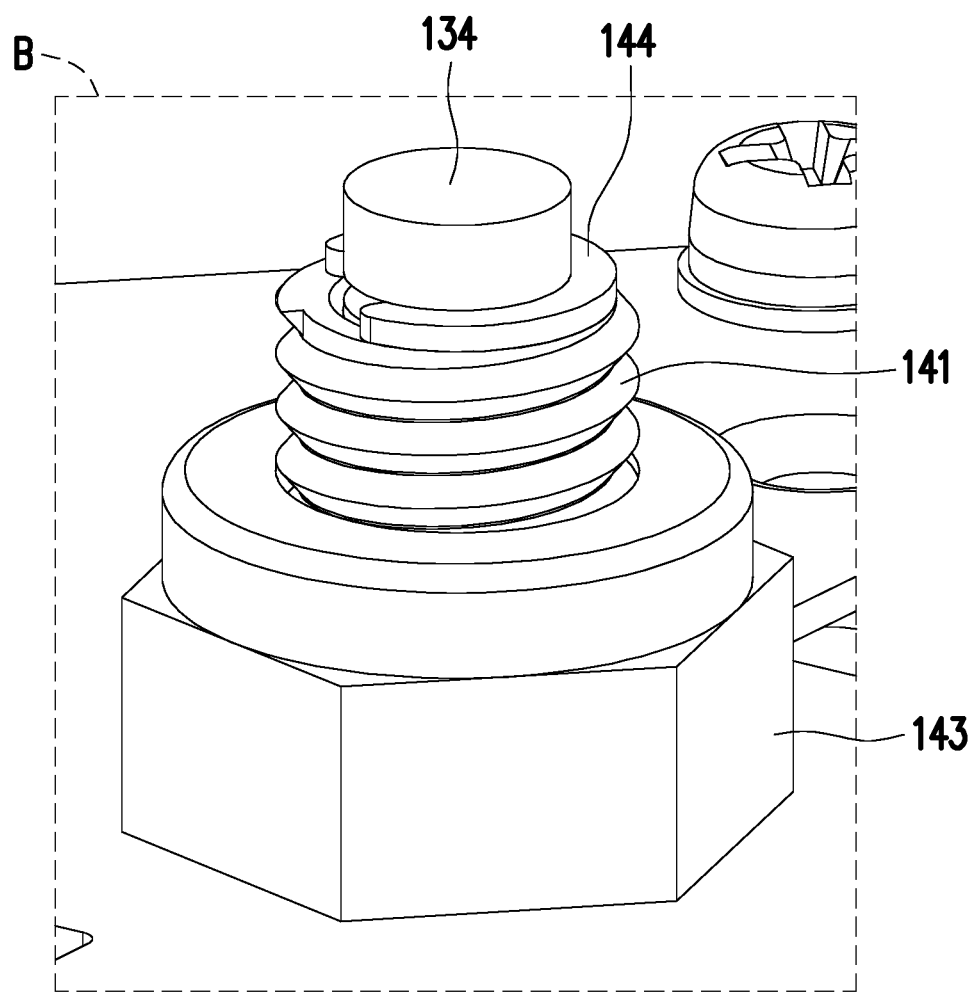
FIG. 6 is an enlarged view of a region B of FIG. 2.

FIG. 2 is a schematic view of an optical element adjustment device of the projector of FIG. 1. FIG. 3 is a schematic view hiding a casing base of the optical element adjustment device of FIG. 2. FIG. 4 is a cross-sectional view of the optical element adjustment device of FIG. 2 taken along the A-A line segment. FIG. 5 is an enlarged view of a region C of FIG. 4. FIG. 6 is an enlarged view of a region B of FIG. 2. Please refer to FIG. 2 to FIG. 6 collectively. An optical element adjustment device 100 includes a casing base 110, an optical element 120, a bearing element 130, and a first adjustment module 140. The optical element 120 is movably disposed in the casing base 110. In the embodiment, the casing base 110 includes a frame 112 and a cover 114 detachably disposed on the frame 112. The optical element 120 is movably disposed in the frame 112.

As shown in FIG. 3, the bearing element 130 includes an outer frame 132 bearing the optical element 120 and shaft portions 134 and 135 protruding from the outer frame 132 and penetrating from the casing base 110. As shown in FIG. 4, the first adjustment module 140 is disposed (sleeved) on the shaft portion 134. As shown in FIG. 4, in the embodiment, the first adjustment module 140 includes a screw shank 141, a first adjustment element 143, a limiting element 144, and a first elastic element 145. As shown in FIG. 5, in the embodiment, the screw shank 141 is sleeved on the shaft portion 134 and penetrates from the cover 114 of the casing base 110. More specifically, the shaft portion 134 of the bearing element 130 penetrates the entire screw shank 141. In addition, the first adjustment member 143 is screwed to the screw shank 141 and abuts against an outer surface of the cover 114 of the casing base 110. In the embodiment, the first adjustment element 143 has an internal thread corresponding to an external thread of the screw shank 141.

As shown in FIG. 5, the shaft portion 134 includes an annular groove 136, and the limiting element 144 is sleeved on the shaft portion 134 and located at the annular groove 136, and the limiting element 144 abuts against a top portion of the screw shank 141. In addition, the limiting element 144 is separated from the first adjustment element 143 and the limiting element 144 is separated from the casing base 110. Therefore, the first adjustment element 143 may move relative to the limiting element 144 and the cover 114 of the casing base 110. As shown in FIG. 6, the limiting element 144 protrudes from a side surface of the shaft portion 134 and is located beside the screw shank 141. In the embodiment, the limiting element 144 is, for example, a C-ring or an E-ring, but the type of the limiting element 144 is not limited thereto.

Please continue to refer to FIG. 5. The first elastic element 145 is disposed between the screw shank 141 and the outer frame 132 of the bearing element 130 (FIG. 2). In the embodiment, the screw shank 141 has a first positioning groove 142 towards the optical element 120 and the bearing element 130 has a second positioning groove 137 towards the screw shank 141. One end (upper end) of the first elastic element 145 is located in the first positioning groove 142 and abuts against the screw shank 141, and the other end (lower end) of the first elastic element 145 is located in the second positioning groove 137 and abuts against the outer frame 132 of the bearing element 130. The screw shank 141 leans closely to the limiting element 144 upwards by the elastic force of the first elastic element 145 and the limiting element 144 is fixed to the shaft portion 134, such that the shaft portion 134 of the bearing element 130 is linked to the screw shank 141 in an extension direction D.

In the embodiment, the first adjustment module 140 further includes a second elastic element 146, disposed between the cover 114 of the casing base 110 (FIG. 2) and the outer frame 132 of the bearing element 130. An upper end of the second elastic element 146 abuts against the cover 114, and a lower end portion of the second elastic element 146 is located in the second positioning groove 137 and abuts against the outer frame 132. The elastic force of the second elastic element 146 may enable the external thread of the screw shank 141 to lean closely to the internal thread of the first adjustment element 143. In this way, the first adjustment element 143 firmly abuts against the cover 114 to ensure that when adjusting the first adjustment element 143, the relative positions of the shaft portion 134 and the cover 114 of the casing base 110 can be accurately adjusted through the screw shank 141.

The optical element adjustment device 100 of the embodiment enables the screw shank 141 to lean closely to the limiting element 144 protruding from the shaft portion 134 through sleeving the screw shank 141 of the first adjustment module 140 on the shaft portion 134 of the bearing element 130 and disposing the first elastic element 145 between the screw shank 141 and the outer frame 132 of the bearing element 130, such that the shaft portion 134 is linked to the screw shank 141 in the extension direction D. In addition, since the optical element adjustment device 100 is screwed to the screw shank 141 through the first adjustment element 143 of the first adjustment module 140, the screw shank 141 is driven by rotating the first adjustment element 143 to move along the extension direction D and the shaft portion 134 of the bearing element 130 moves correspondingly, such that the optical element 120 fixed to the bearing element 130 moves along the extension direction D, thereby adjusting the position of the optical element 120 along the extension direction D.

In short, since the elastic force of the first elastic element 145 enables the screw shank 141 to lean closely to the limiting element 144; the elastic force of the second elastic element 146 enables the first adjustment element 143 to lean closely to the cover 114 of the casing base 110; the first adjustment element 143 and the screw shank 141 are screwed to each other; and the shaft portion 134 and the outer frame 132 are connected to each other. Therefore, the first adjustment element 143 may be adjusted by rotation to drive the shaft portion 134 in the extension direction D so as to enable the outer frame 132 to move up and down relative to the cover 114 of the casing base 110. The optical element 120 fixed to the bearing element 130 moves up and down relative to the cover 114 of the casing base 110.

In addition, in the embodiment, an outer diameter R2 of the second elastic element 146 is greater than an outer diameter R1 of the first elastic element 145, and the first elastic element 145 is located in the second elastic element 146. Such a design enables the first elastic element 145 and the second elastic element 146 to be coaxially disposed to reduce waste of space. In addition to enabling the optical element 120 to move up and down along the extension direction D of the shaft portion 134 through the first adjustment module 140, the optical element adjustment device 100 of the embodiment further enables the optical element 120 to be rotated through the second adjustment module 150.

Figure 7:
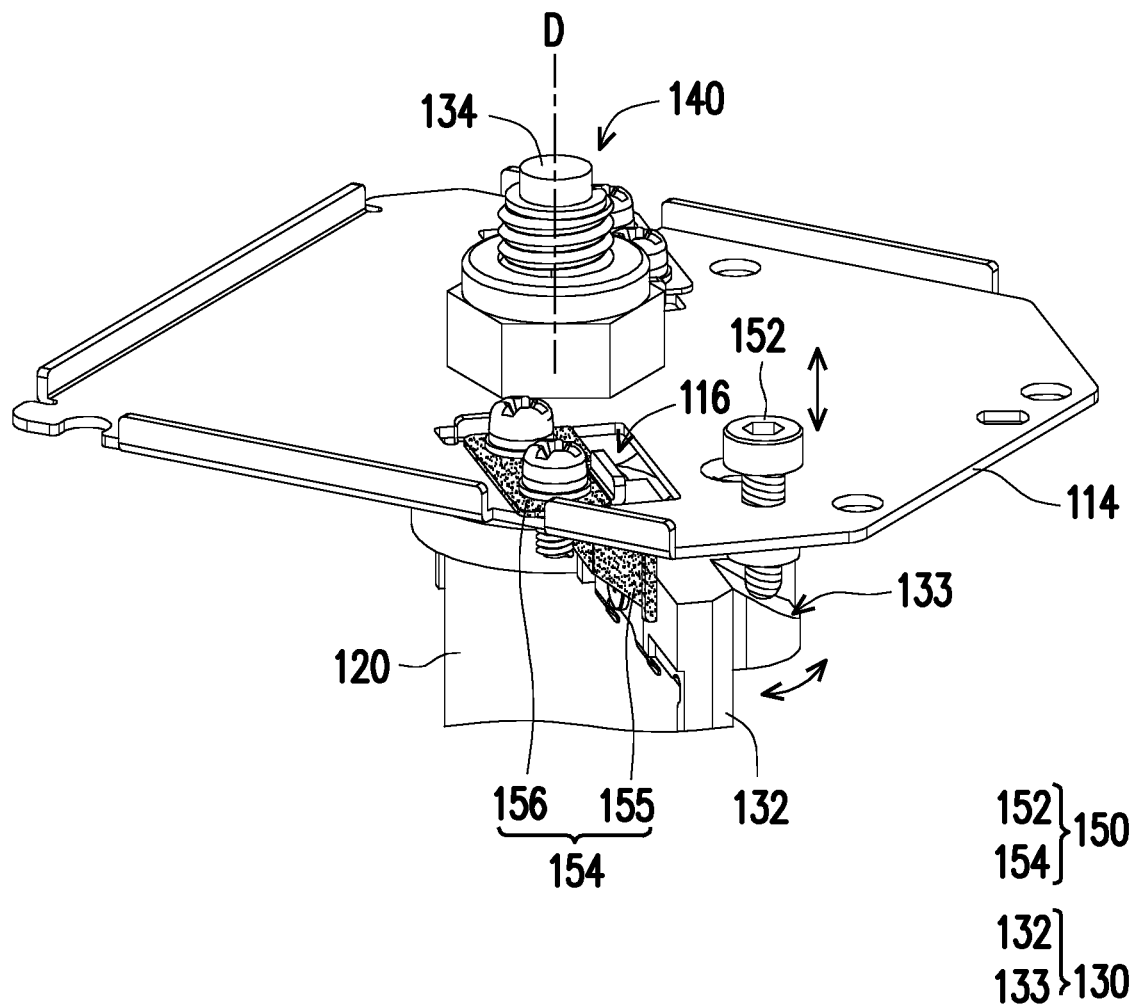
FIG. 7 is a schematic view of a portion of the optical element adjustment device of FIG. 2.
Figure 8:
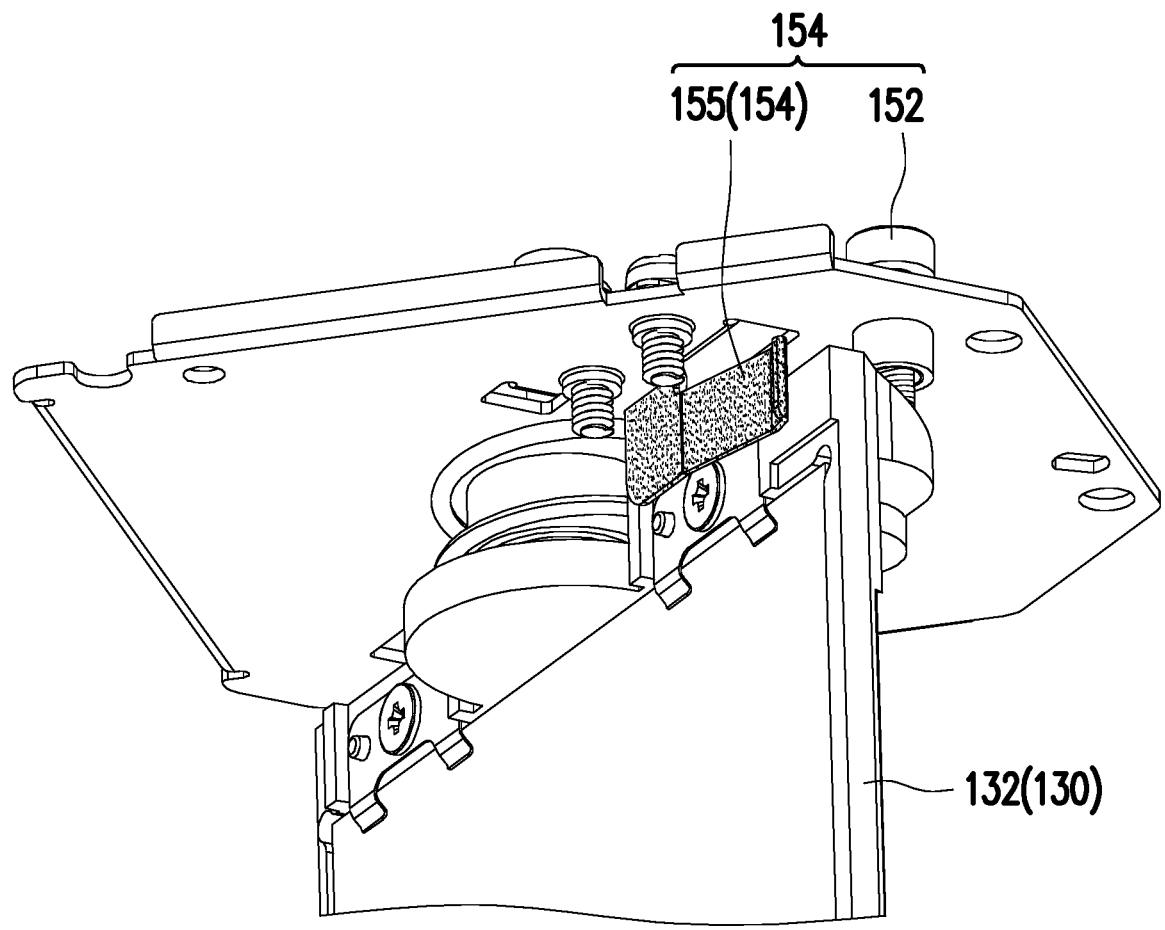
FIG. 8 is a schematic view of FIG. 7 from another perspective.

FIG. 7 is a schematic view of a portion of the optical element adjustment device of FIG. 2. FIG. 8 is a schematic view of FIG. 7 from another perspective. It should be noted that, in FIG. 7 and FIG. 8, in order to clearly show the position and shape of a third elastic element 154, the third elastic element 154 is dotted.

Please refer to FIG. 2 and FIG. 7. In the embodiment, a bearing element 130 includes an inclined surface 133 inclined to an extension direction D and the extension direction D of a shaft portion 134 does not pass through the center of the inclined surface 133. In other words, the inclined surface 133 is a region located outside the extension direction D of the shaft portion 134.

In the embodiment, an optical element adjustment device 100 further includes a second adjustment module 150. The second adjustment module 150 includes a second adjustment element 152 and the third elastic element 154. The second adjustment element 152 passes through a cover 114 and abuts against the inclined surface 133 of the bearing element 130. The second adjustment element 152 is, for example, a screw, but the type of the second adjustment element 152 is not limited thereto.

Please refer to FIG. 7 and FIG. 8. The third elastic element 154 is fixed to the cover 114 of a casing base 110 and abuts against a bearing element 130. Specifically, the third elastic element 154 includes a push arm 155 and a fixing portion 156. The third elastic element 154 passes through a hole 116 of the cover 114 and the fixing portion 156 of the third elastic element 154 is located above the cover 114 and is fixed to the cover 114. The push arm 155 of the third elastic element 154 is located in the casing base 110 (FIG. 2) and pushes against the bearing element 130. In the embodiment, the second adjustment element 152 and the third elastic element 154 respectively contact opposite sides of the bearing element 130, but the relative positions of the second adjustment element 152 and the third elastic element 154 are not limited thereto.

The second adjustment element 152 is configured to push down against the inclined surface 133 of the bearing element 130, such that the optical element 120 fixed to the bearing element 130 rotates around a shaft portion 134 while the third elastic element 154 accumulates elastic potential energy. When the second adjustment element 152 moves in a direction away from the inclined surface 133 of the bearing element 130, the third elastic element 154 releases the elastic potential energy, enabling the bearing element 130 to rotate in an opposite direction, such that the second adjustment element 152 continues to contact the inclined surface 133.

Therefore, the optical element adjustment device 100 of the embodiment enables the optical element 120 to move along the extension direction D by the first adjustment module 140, and enables the optical element 120 rotate with the extension direction D as the axis by the second adjustment module 150, such that the optical element 120 can provide good optical effects.

Based on the above, the optical element adjustment device of the disclosure allows the screw shank to lean closely to the limiting element protruding from the shaft portion through sleeving the screw shank of the first adjustment module on the shaft portion of the bearing element and disposing the first elastic element between the screw shank and the bearing element, such that the shaft portion is linked to the screw shank in the extension direction. In addition, since the optical element adjustment device is screwed to the screw shank through the first adjustment element of the first adjustment module, rotating the first adjustment element is configured to drive the screw shank to move along the extension direction and the shaft portion of the bearing element moves correspondingly, such that the optical element fixed to the bearing element moves along the extension direction, thereby adjusting the position of the optical element along the extension direction.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. An optical element adjustment device, comprising a casing base, an optical element, a bearing element, and a first adjustment module, wherein the optical element is movably disposed in the casing base;

the bearing element comprises an outer frame bearing the optical element and a shaft portion protruding from the outer frame and penetrating from the casing base; and the first adjustment module is disposed on the shaft portion and the first adjustment module comprises a screw shank, a first adjustment element, a limiting element, and a first elastic element, wherein the screw shank is sleeved on the shaft portion and penetrates from the casing base;

the first adjustment element is screwed to the screw shank and abuts against the casing base;

the limiting element protrudes from a side surface of the shaft portion and is located beside the screw shank; and the first elastic element is disposed between the screw shank and the outer frame of the bearing element, such that the screw shank leans closely to the limiting element, thereby enabling the shaft portion to be linked to the screw shank in an extension direction of the shaft portion, wherein the first adjustment element is configured to drive the screw shank to move along the extension direction and the shaft portion of the bearing element moves correspondingly, such that the optical element fixed to the bearing element moves along the extension direction.

2. The optical element adjustment device according to claim 1, wherein the shaft portion comprises an annular groove and the limiting element is sleeved on the annular groove.

3. The optical element adjustment device according to claim 2, wherein the limiting element is separated from the first adjustment element and is separated from the casing base.

4. The optical element adjustment device according to claim 1, wherein the screw shank has a first positioning groove towards the optical element and an end portion of the first elastic element is located in the first positioning groove.

5. The optical element adjustment device according to claim 1, wherein the first adjustment module further comprises a second elastic element disposed between the casing base and the outer frame of the bearing element, such that an external thread of the screw shank leans closely to an internal thread of the first adjustment element.

6. The optical element adjustment device according to claim 5, wherein the bearing element has a second positioning groove towards the screw shank and an end portion of the second elastic element is located in the second positioning groove.

7. The optical element adjustment device according to claim 5, wherein an outer diameter of the second elastic element is greater than an outer diameter of the first elastic element and the first elastic element is located in the second elastic element.

8. The optical element adjustment device according to claim 1, wherein the bearing element comprises an inclined surface inclined to the extension direction and the extension direction of the shaft portion does not pass through a center of the inclined surface, the optical element adjustment device further comprises a second adjustment module, and the second adjustment module comprises a second adjustment element and a third elastic element, wherein
the second adjustment element passes through the casing base and abuts against the inclined surface; and
the third elastic element is fixed to the casing base and abuts against the bearing element, wherein the second adjustment element is configured to push against the inclined surface of the bearing element, such that the optical element fixed to the bearing element rotates around the shaft portion, and the third elastic element accumulates an elastic potential energy,
when the second adjustment element moves in a direction away from the inclined surface of the bearing element, the third elastic element releases the elastic potential energy, enabling the bearing element to rotate in an opposite direction, such that the second adjustment element continues to contact the inclined surface.

9. The optical element adjustment device according to claim 1, wherein the shaft portion of the bearing element penetrates the entire screw shank.

10. The optical element adjustment device according to claim 1, wherein the casing base comprises a frame and a cover detachably disposed on the frame, the screw shank penetrates from the cover of the casing base, and the first adjustment element abuts against the cover of the casing base.

11. A projector, comprising a light source module, a light valve, and a projection lens, wherein
the light source module comprises a light source and an optical element adjustment device, the light source is configured to emit an excitation beam, and the optical element adjustment device is located on an optical path of the excitation beam, wherein the optical element adjustment device comprises a casing base, an optical element, a bearing element, and a first adjustment module, wherein
the optical element is movably disposed in the casing base;
the bearing element comprises an outer frame bearing the optical element and a shaft portion protruding from the outer frame and penetrating from the casing base; and
the first adjustment module is disposed on the shaft portion and the first adjustment module includes a screw shank, a first adjustment element, a limiting element, and a first elastic element, wherein
the screw shank is sleeved on the shaft portion and penetrates from the casing base;
the first adjustment element is screwed to the screw shank and abuts against the casing base;
the limiting element protrudes from a side surface of the shaft portion and is located beside the screw shank; and
the first elastic element is disposed between the screw shank and the outer frame of the bearing element, such that the screw shank leans closely against the limiting element, thereby enabling the shaft portion to be linked to the screw shank in an extension direction of the shaft portion, wherein the first adjustment element is configured to drive the screw shank to move along the extension direction and the shaft portion of the bearing element moves correspondingly, such that the optical element fixed to the bearing element moves along the extension direction;
the light valve is configured to convert the excitation beam into an image beam; and
the projection lens is configured to project the image beam.

12. The projector according to claim 11, wherein the shaft portion comprises an annular groove and the limiting element is sleeved on the annular groove.

13. The projector according to claim 12, wherein the limiting element is separated from the first adjustment element and is separated from the casing base.

14. The projector according to claim 11, wherein the screw shank has a first positioning groove towards the optical element and an end portion of the first elastic element is located in the first positioning groove.

15. The projector according to claim 11, wherein the first adjustment module further comprises a second elastic element, disposed between the casing base and the outer frame of the bearing element, such that an external thread of the screw shank leans closely to an internal thread of the first adjustment element.

16. The projector according to claim 15, wherein the bearing element has a second positioning groove towards the screw shank and an end portion of the second elastic element is located in the second positioning groove.

17. The projector according to claim 15, wherein an outer diameter of the second elastic element is greater than an outer diameter of the first elastic element and the first elastic element is located in the second elastic element.

18. The projector according to claim 11, wherein the bearing element comprises an inclined surface inclined to the extension direction, the extension direction of the shaft portion does not pass through a center of the inclined surface, the optical element adjustment device further comprises a second adjustment module, and the second adjustment module comprises a second adjustment element and a third elastic element, wherein the second adjustment element passes through the casing base and abuts against the inclined surface; and the third elastic element is fixed to the casing base and abuts against the bearing element, wherein the second adjustment element is configured to push against the inclined surface of the bearing element, such that the optical element fixed to the bearing element rotates around the shaft portion, and the third elastic element accumulates an elastic potential energy, when the second adjustment element moves in a direction away from the inclined surface of the bearing element, the third elastic element releases the elastic potential energy, enabling the bearing element to rotate in an opposite direction, such that the second adjustment element continues to contact the inclined surface.

19. The projector according to claim 11, wherein the shaft portion penetrates the entire screw shank.

20. The projector according to claim 11, wherein the casing base comprises a frame and a cover detachably disposed on the frame, the screw shank penetrates from the cover of the casing base, and the first adjustment element abuts against the cover of the casing base.

* * * * *